United States Patent
Kurrasch et al.

(10) Patent No.: US 11,882,152 B2
(45) Date of Patent: Jan. 23, 2024

(54) INFORMATION SECURITY SYSTEM AND METHOD FOR PHISHING WEBSITE IDENTIFICATION BASED ON IMAGE HASHING

(71) Applicant: Bank of America Corporation, Charlotte, NC (US)

(72) Inventors: Peter George Kurrasch, Palatine, IL (US); Martin Andrew Sutton, Flintshire (GB)

(73) Assignee: Bank of America Corporation, Charlotte, NC (US)

( * ) Notice: Subject to any disclaimer, the term of this patent is extended or adjusted under 35 U.S.C. 154(b) by 390 days.

(21) Appl. No.: 17/389,897

(22) Filed: Jul. 30, 2021

(65) Prior Publication Data
US 2023/0033134 A1 Feb. 2, 2023

(51) Int. Cl.
*H04L 9/40* (2022.01)

(52) U.S. Cl.
CPC ........ *H04L 63/1483* (2013.01); *H04L 63/145* (2013.01); *H04L 63/1416* (2013.01); *H04L 63/20* (2013.01)

(58) Field of Classification Search
CPC .................................................. H04L 63/1483
See application file for complete search history.

(56) References Cited

U.S. PATENT DOCUMENTS

| | | | |
|---|---|---|---|
| 7,290,035 B2 | 10/2007 | Mattathil | |
| 7,580,982 B2 | 8/2009 | Owen et al. | |
| 7,668,921 B2 | 2/2010 | Proux et al. | |
| 8,429,180 B1 * | 4/2013 | Sobel | G06F 21/55 707/758 |
| 8,607,361 B2 | 12/2013 | Gillum | |
| 8,627,479 B2 | 1/2014 | Wittenstein et al. | |
| 8,683,052 B1 | 3/2014 | Brinskelle | |
| 8,713,677 B2 | 4/2014 | Soghoian et al. | |
| 8,756,661 B2 | 6/2014 | Levenberg | |
| 8,763,117 B2 | 6/2014 | Carothers | |
| 8,813,228 B2 | 8/2014 | Magee et al. | |
| 8,838,709 B2 | 9/2014 | Nussey et al. | |
| 8,849,921 B2 | 9/2014 | Morss et al. | |
| 8,990,933 B1 | 3/2015 | Magdalin | |
| 9,026,507 B2 | 5/2015 | Shraim et al. | |
| 9,077,671 B2 | 7/2015 | Yanovsky et al. | |
| 9,123,027 B2 | 9/2015 | Srivastava et al. | |
| 9,130,989 B2 | 9/2015 | Windsor et al. | |
| 9,143,478 B2 | 9/2015 | Ramaswamy | |

(Continued)

*Primary Examiner* — Khang Do

(57) ABSTRACT

A system for detecting phishing websites accesses a website that comprises a plurality of images. The system extracts the plurality of images from the website. The system generates a hash value for each image from the plurality of images. Each hash value uniquely identifies its corresponding image. The system generates a first overall hash value for the website by hashing the generated hash values. The first overall hash value represents a signature of the website. the system compares the first overall hash value with a second overall hash value that is associated with a phishing website. The system determines whether the first overall hash value corresponds to the second overall hash value. If it is determined that the first overall hash value corresponds to the second overall hash value, the system determines that the website is associated with the phishing website.

20 Claims, 3 Drawing Sheets

(56) References Cited

U.S. PATENT DOCUMENTS

| | | |
|---|---|---|
| 9,223,998 B1 | 12/2015 | Grisso |
| 9,325,727 B1 | 4/2016 | Emigh |
| 9,369,433 B1 | 6/2016 | Paul et al. |
| 9,369,437 B2 | 6/2016 | Holloway et al. |
| 9,373,267 B2 | 6/2016 | Sadeh-Koniecpol et al. |
| 9,384,345 B2 | 7/2016 | Dixon et al. |
| 9,501,746 B2 | 11/2016 | Prakash |
| 9,509,715 B2 | 11/2016 | Bach |
| 9,521,161 B2 | 12/2016 | Reumann et al. |
| 9,558,497 B2 | 1/2017 | Carvalho |
| 9,621,566 B2 | 4/2017 | Gupta et al. |
| 9,635,042 B2 | 4/2017 | Brown et al. |
| 9,674,129 B1 | 6/2017 | Everton et al. |
| 9,686,308 B1 | 6/2017 | Srivastava |
| 9,736,149 B2 | 8/2017 | Bettenburg et al. |
| 9,847,973 B1 | 12/2017 | Jakobsson et al. |
| 10,243,904 B1 | 3/2019 | Wescoe et al. |
| 10,264,017 B2 | 4/2019 | Stemm et al. |
| 10,270,806 B2 | 4/2019 | Akcin |
| 10,339,306 B1 | 7/2019 | Katz |
| 10,404,745 B2 | 9/2019 | Verma et al. |
| 10,536,449 B2 | 1/2020 | Maylor et al. |
| 10,574,684 B2 | 2/2020 | Segal et al. |
| 10,581,908 B2 | 3/2020 | Hunt et al. |
| 10,628,797 B2 | 4/2020 | Shraim et al. |
| 10,715,543 B2 | 7/2020 | Jakobsson |
| 10,728,239 B2 | 7/2020 | Maylor et al. |
| 10,742,821 B2 | 8/2020 | Chauhan |
| 10,749,887 B2 | 8/2020 | Hawthorn et al. |
| 10,853,855 B2 | 12/2020 | John |
| 10,855,716 B2 | 12/2020 | Irimie et al. |
| 10,904,286 B1* | 1/2021 | Liu .................. H04L 9/3236 |
| 11,336,689 B1* | 5/2022 | Miramirkhani ..... H04L 63/0281 |
| 11,444,978 B1* | 9/2022 | Liao .................. G06F 40/30 |
| 2003/0084298 A1* | 5/2003 | Messerges ............ H04L 9/3236 |
| | | 713/176 |
| 2014/0173726 A1* | 6/2014 | Varenhorst .......... H04L 63/1416 |
| | | 726/22 |
| 2015/0067839 A1* | 3/2015 | Wardman ............... G06Q 10/10 |
| | | 726/22 |
| 2017/0041330 A1* | 2/2017 | Hunt .................. H04L 63/1416 |
| 2017/0346851 A1 | 11/2017 | Drake |
| 2018/0103043 A1* | 4/2018 | Kupreev ............ H04L 63/1483 |
| 2018/0124109 A1* | 5/2018 | Hunt .................. G06V 30/40 |
| 2019/0014149 A1* | 1/2019 | Cleveland ............. G06N 3/045 |
| 2019/0124109 A1* | 4/2019 | Foster .................. H04L 67/306 |
| 2020/0036751 A1* | 1/2020 | Kohavi .............. H04L 63/1416 |
| 2020/0137110 A1* | 4/2020 | Tyler .................. H04L 63/1483 |
| 2020/0195694 A1* | 6/2020 | Kalinin ............... G06Q 10/107 |
| 2020/0252428 A1* | 8/2020 | Gardezi ............. H04L 63/1416 |
| 2020/0358799 A1* | 11/2020 | Boyer .................. H04L 51/42 |
| 2021/0081962 A1* | 3/2021 | Peters .................. G06Q 40/12 |
| 2021/0099484 A1* | 4/2021 | Li ...................... G06F 16/2255 |
| 2021/0144174 A1* | 5/2021 | N ........................ G06N 20/00 |
| 2021/0234892 A1* | 7/2021 | Narayanaswamy ....................... H04L 63/1466 |
| 2021/0377300 A1* | 12/2021 | Devane ............... H04L 63/1416 |
| 2022/0400134 A1* | 12/2022 | Chen Kaidi ........... G06V 30/19 |
| 2023/0033919 A1 | 2/2023 | Kurrasch et al. |

\* cited by examiner

INFORMATION SECURITY SYSTEM AND METHOD FOR PHISHING WEBSITE IDENTIFICATION BASED ON IMAGE HASHING

TECHNICAL FIELD

The present disclosure relates generally to information security, and more specifically to information security system and method for phishing website identification based on image hashing.

BACKGROUND

As the Internet continues to be utilized by an ever-increasing number of users, so does fraudulent and criminal activity via the Internet. It is challenging to determine whether a website is legitimate or associated with a fraudulent or phishing attack. Phishing attacks are becoming more prevalent and are a growing concern that can take different forms. For example, a "phisher" can develop a phishing website that looks similar to a well-known and/or trusted website, and send a deceptive email/text message to one or more unsuspecting users in an attempt to elicit the users to respond with personal information that can be used at users' expense.

SUMMARY

Current information security technologies are not configured to provide a reliable and efficient solution for phishing website detection or identification. This disclosure contemplates systems and methods for detecting and identifying phishing websites using image hashing. Generally, certain embodiments of the disclosed system generate an overall hash value that is used for identifying a website. The disclosed system determines that a particular website is associated with a phishing website if a first overall hash value associated with the particular website corresponds to a second overall hash value associated with a website that is known to be the phishing website. The corresponding description below describes the process of generating an overall hash value for a website and determining whether the website is associated with a phishing web site.

For example, assume that the disclosed system accesses a first website that is known to be a phishing website. The disclosed system may access the first website when a user loads or views the first website on a web browser. In some cases, the disclosed system may implement a script that automatically accesses websites including the first website. The disclosed system extracts a first plurality of images from the first website. The disclosed system generates a hash value for each image from the first plurality of images. Each hash value may include a string of numbers, letters, and/or symbols that uniquely identifies its corresponding image. The disclosed system generates a first overall hash value that identifies the first website. For example, the disclosed system may generate the first overall hash value by inputting the hash values to a hashing algorithm. Thus, the first overall hash value may be a hash of the hash values. The disclosed system may use the first overall hash value for identifying other websites that are associated with the phishing website, as described below.

For example, assume that the disclosed system accesses a second website. The disclosed system extracts a second plurality of images from the second website. The disclosed system generates a hash value for each image from the second plurality of images. The disclosed system generates a second overall hash value that identifies the second website. The disclosed system compares the second overall hash value with the first overall hash value. The disclosed system determines whether the second overall hash value corresponds to the first overall hash value. If the disclosed system determines that the second overall hash value corresponds to the first overall value, the disclosed system determines that the second website is associated with the phishing web site.

With respect to phishing website identification, in one embodiment, a system for detecting phishing websites comprises a processor and a memory. The processor accesses a first website comprising a first plurality of images, where the first website is known to be a phishing website that is attempting to impersonate a target website. The processor extracts the first plurality of images from the first website. For at least a first image from the first plurality of images, the processor determines a first hash value for the first image, where the first hash value comprises a first serial number uniquely identifying the first image. The processor determines a first overall hash value for the first web site, where determining the first overall hash value comprises hashing the first hash value. The first overall hash value represents a first signature associated with the first website. The processor accesses a second website comprising a second plurality of images. The processor extracts the second plurality of images from the second web site. For at least a second image from the second plurality of images, the processor determines a second hash value for the second image, where the second hash value comprises a second serial number uniquely identifying the second image. This "second image" is the "first image of the second plurality, which is taken from the second website." In this process, the images are taken in consideration and processed in the same order as in the first website. The processor determines a second overall hash value for the second website, where determining the second overall hash value comprises hashing the second hash value. The second overall hash value represents a second signature associated with the second website. The processor compares the second overall hash value with the first overall hash value. The processor determines whether the second overall hash value corresponds to the first overall hash value. In response to determining that the second overall hash value corresponds to the first overall hash value, the processor determines that the second website is associated with the phishing website. The memory is operably coupled with the processor. The memory is operable to store the first plurality of images and the second plurality of images.

With respect to phishing website classification, in one embodiment, a system of phishing website classification comprises a processor and a memory. The processor accesses a first website comprising a first plurality of images, where the first website is known to be a phishing website that is attempting to impersonate a target website. The processor extracts the first plurality of images from the first website. For at least a first image from the first plurality of images, the processor determines a first hash value for the first image, where the first hash value comprises a first serial number uniquely identifying the first image. The processor determines a first overall hash value for the first web site, where determining the first overall hash value comprises hashing the first hash value. The first overall hash value represents a first signature associated with the first web site. The processor accesses a list of overall hash values which in turn map to a plurality of phishing websites. Each phishing website from among the plurality of phishing websites is associated with a different overall hash value from among a plurality of overall hash values. Each overall hash value from among the plurality of overall hash values is used to identify a different phishing web site from among the plurality of phishing web sites. The processor compares the first overall hash value with at least a second overall hash value from among the plurality of overall hash values, where the second overall hash value is associated with a particular phishing website. The processor determines whether the first overall hash value corresponds to the second overall hash value. In response to determining that the first overall hash value corresponds to the second overall hash value, the processor classifies the first website with the particular phishing website in a first phishing website class. The memory is operably coupled with the processor. The memory is operable to store the list of the plurality of phishing websites.

The disclosed system provides several practical applications and technical advantages, which include at least: 1) technology that generates a hash value for each image displayed on a particular website for determining whether the particular website is associated with a phishing website; 2) technology that determines whether the particular website is associated with the phishing website by image hashing and comparing a first overall hash value that uniquely identifies the particular website with a second overall hash value that is used to identify the phishing website; 3) technology that is able to detect a fraudulent website by comparing its images against images of a known phishing website; 4) technology that classifies phishing websites whose overall hash values correspond to each other in the same phishing website class; 5) technology that detects correlations between fraudulent activities (or phishing content) detected on various phishing web sites based on determining that the various phishing web sites share content (e.g., images, text, etc.) and belong to the same phishing class or phishing campaign; and 6) technology that detects correlations between various phishing websites that share content (e.g., images, text, etc.), and uses this correlation to determine that fraudulent activities detected on these phishing websites are correlated, and determine a pattern of these fraudulent activities.

As such, the disclosed system may improve the current information security and phishing website detection technologies by leveraging image hashing. For example, by implementing image hashing, the disclosed system may determine whether a particular website that may have a different domain or Uniform Resource Locator (URL) compared to a phishing website, such as ".biz," ".bank," ".online," etc., have one or more images whose hash values correspond to their one or more counterpart images used in developing the phishing website. The disclosed system is further configured to detect correlations between different fraudulent activities detected on different websites. For example, if the disclosed system determines that a first website is related to a phishing website (e.g, by image hashing as described herein), the disclosed system determines that a first fraudulent activity detected on or attributed to the first website is associated with a second fraudulent activity is detected on or attributed to the phishing website. In this manner, the disclosed system may determine coordination between different fraudulent activities on different websites, and use this information to determine a source of the different fraudulent activities that are determined to be related. Thus, the disclosed system may be integrated into a practical applications of phishing website identification and phishing website classification based on hashing images of web sites, generating overall hash values for the web sites, and comparing the overall hash values with overall hash values associated with known phishing websites. In the practical application of phishing website identification, the disclosed system identifies new phishing websites that previously were not documented, and store them in a database for reference. In the practical application of phishing website classification, the disclosed system classifies phishing websites that are related to each other (e.g., have the same overall hash value) together in the same phishing website class. The disclosed system can use this information to identify correlations between phishing websites.

The disclosed system may be further integrated into an additional practical application of identifying correlations between phishing websites whose overall hash values correspond to each other. For example, over time the disclosed system may learn more information about website_a, such as IP addresses, web hosting services used, hackers selling the underlying kits on the darkweb, users who have fallen victim to the phishing website, phishing email that directs users to the phishing websites, and etc. As the disclosed system builds up this knowledge, if it is determined that website_b, website_d, and website_g are also related, the disclosed system is able to put together a more complete picture of correlations between these websites, which in turn guides us towards more effective strategies to combat the threats posed by phishing websites.

The disclosed system may be further integrated into an additional practical application of identifying correlations between phishing websites and threat actors. For example, assume that threat actor_a is known to be associated with a phishing website_a. Also, assume that the disclosed system determines that phishing website_b has the same overall hash value as the phishing website_a. Thus, the disclosed system determines that the threat actor_a is also associated with the phishing website_b. In this manner threat actor(s) and phishing website(s) that belong the to the same phishing campaign are identified. In another example, assume that it is determined that a user_a has become a victim of a phishing website_a, and a user b has become a victim of a phishing website_b. Also, assume that the disclosed system determines that the phishing website_a and phishing website_b have the same overall hash values. In this case, the disclosed system can conclude that phishing website_a and phishing website_b are associated with same threat actor(s), and identify the correlation between the phishing website_a and phishing website_b and threat actors(s).

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions for detecting phishing websites. This disclosure provides various systems and methods for phishing website identification based on image hashing. In one embodiment, system 100 and method 200 for phishing website identification based on image hashing are described in FIGS. 1 and 2, respectively. In one embodiment, system 100 and method 300 for phishing website classification based on image hashing are described in FIGS. 1 and 3, respectively.

Figure 1:
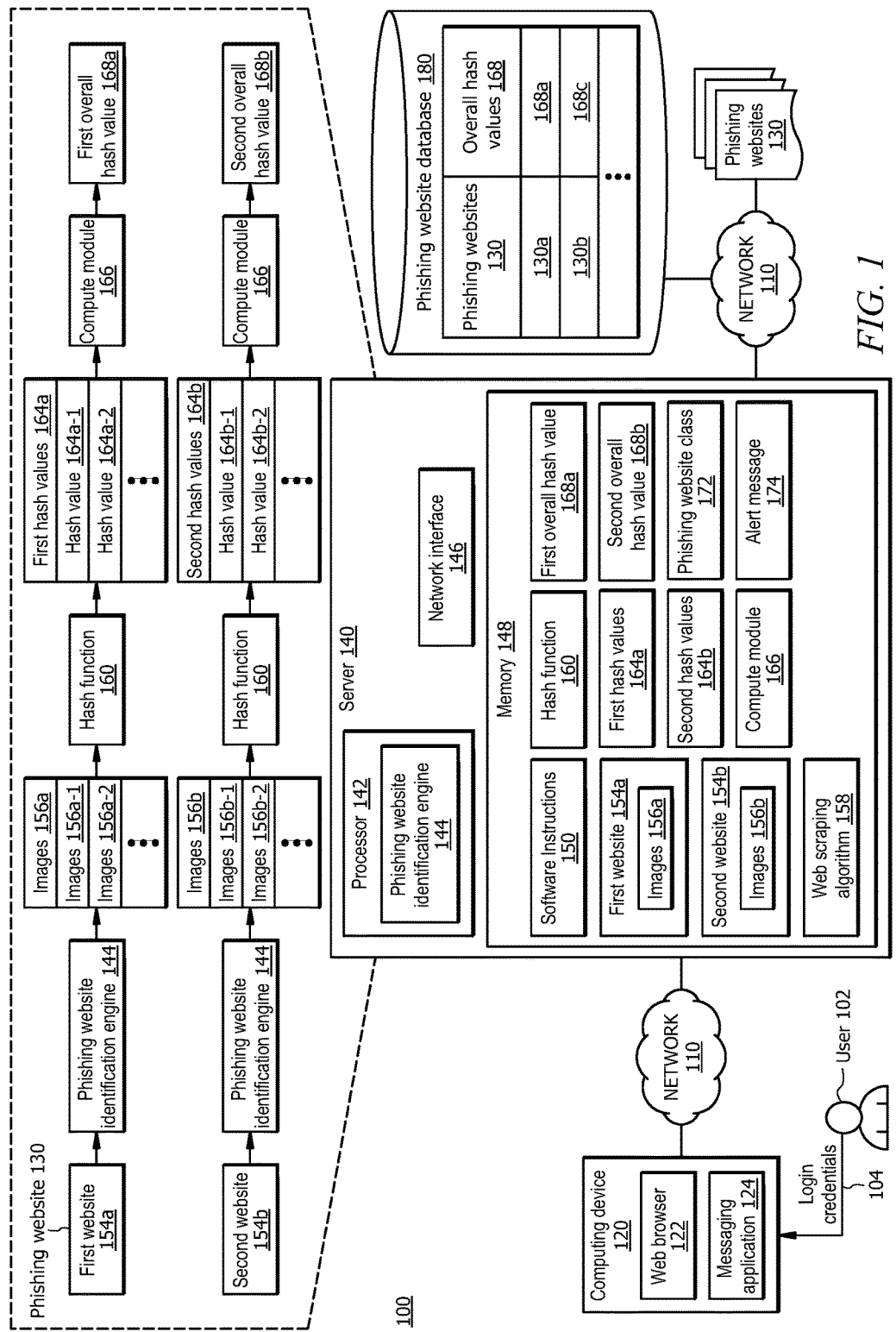
FIG. 1 illustrates an embodiment of a system configured for phishing website identification and classification based on image hashing.

Example System for Phishing Website Identification and Classification Based on Image Hashing FIG. 1 illustrates one embodiment of a system 100 that is configured to detect phishing websites 130 using image hashing. In one embodiment, system 100 comprises a server 140. In some embodiments, system 100 further comprises a network 110 and a computing device 120. Network 110 enables components of system 100. Server 140 comprises a processor 142 in signal communication with a memory 148. Memory 148 stores software instructions 150 that when executed by the processor 142, cause the processor 142 to perform one or more functions described herein. For example, when the software instructions 150 are executed, the processor 142 executes a phishing website identification engine 144 to determine whether a website 152 is associated with a phishing website 130 or not. In other embodiments, system 100 may not have all of the components listed and/or may have other elements instead of, or in addition to, those listed above.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing device 120 is generally any device that is configured to process data and interact with users 102. Examples of computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120.

The user 102 may access a website 154 (e.g., a first website 154a or a second website 154b) from a web browser 122. In some cases, the website 154 may be a phishing website 130 (e.g., phishing website 130a or 130b, etc.) that contains fraudulent or phishing content. The phishing website 130 may be designed and developed by bad actors to impersonate a trusted and/or well-known website 154. For example, the phishing website 130 may be designed to elicit the user 102 to provide their login credentials 104 to their account associated with the trusted website 154. In another example, the phishing website 130 may elicit the user 102 to provide other information, such as personal information, confidential information, and/or financial account information (also collectively referred to herein as "private information"). In some cases, the user 102 may receive a communication, such as a phishing email message, phishing text message, and/or the like, and access the communication on the messaging application 124. The communication may include a selectable link to the phishing website 130. By accessing the selectable link, the phishing website 130 may be viewed on the web browser 122. In either of such cases, system 100 is configured to detect such phishing websites 130, as described further below.

Phishing website database 180 generally comprises any storage architecture. Examples of the phishing website database 180 include, but are not limited to, a network-attached storage cloud, a storage area network, a storage assembly directly (or indirectly) coupled to one or more components of the system 100. The phishing website database 180 stores a record of a plurality of known or predetermined phishing websites 130 associated with or linked to a plurality of overall hash values 168. For example, the phishing website database 180 stores the phishing website 130a that is linked to or associated with the overall hash value 168a (determined by the phishing web site identification engine 144), phishing website 130b that is linked to associated with the overall hash value 168c, and so on. Each overall hash value 168 may be associated with one or more phishing websites 130. For example, overall hash value 168a may be associated with phishing website-a, phishing website-b, phishing website-d, and phishing website-g. The overall hash value 168b may be associated with phishing website-c, phishing website-e, and phishing website-f. Other overall hash values 168 may be associated with other phishing websites. If, for example, the phishing website identification engine 144 determines that the second website 154b is associated with the phishing website 130a (e.g., determines that the second overall hash value 168b corresponds to the first overall hash value 168a, the phishing website identification engine 144 links or associates the second website 154b and the second overall hash value 168b to the phishing website 130a, as illustrated in the example of FIG. 1. This process is described further below in conjunction with the operational flow of the system 100 and method 200.

Server

Server 140 is generally a server or any other device configured to process data and communicate with computing devices (e.g., computing device 120, computing devices that are hosting the phishing websites 130), databases, etc., via the network 110. In one example, the server 140 may include or be communicatively coupled with a Domain Name System (DNS) server associated with the computing device 120. The server 140 is generally configured to oversee operations of the phishing website identification engine 144, as described further below in conjunction with an operational flow of system 100 and method 200 described in FIG. 2.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the phishing website identification engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more steps of methods 200 and 300 as described in FIGS. 2 and 3, respectively.

Network interface 146 is configured to enable wired and/or wireless communications (e.g., via network 110). The network interface 146 is configured to communicate data between the server 140 and other devices (e.g., computing device 120, computing devices that are hosting the phishing websites 130), databases, systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the software instructions 150, first website 154a, second website 154b, web scraping algorithm 158, hash function 160, first hash values 164a, second hash values 164b, compute module 166, first overall hash value 168a, second overall hash value 168b, phishing website class 172, alert message 174, and/or any other data or instructions. The software instructions 150 may comprise any suitable set of instructions, logic, rules, or code operable to execute the processor 142.

Phishing Website Identification Engine

Phishing website identification engine 144 may be implemented by the processor 142 executing software instructions 150, and is generally configured to determine whether a website 154 is a phishing website 130 (e.g., phishing website 130a or 130b, etc.) based on image hashing.

To implement an image hashing process, the phishing website identification engine 144 may extract images 156 from a website 154.

In one embodiment, the phishing website identification engine 144 may be configured to execute a web scraping algorithm 158 to extract images 156 from the website 154.

In other embodiments, the phishing website identification engine 144 may execute any other suitable method for extracting images 156 from the website 154, e.g., accessing images 156 and/or links to the images 156 from the Document Object Model (DOM) associated with the website 154.

The phishing website identification engine 144 may be configured to determine whether the website 154 is a phishing website 130 (e.g., phishing website 130a or 130b, etc.) based on comparing an overall hash value 168 associated with the website 154 with another overall hash value 168 that is associated with a phishing website 130 (e.g., phishing website 130a or 130b, etc.). This process is described below in conjunction with the operational flow of the system 100.

Operational Flow

Extracting Images from a First Website

The operational flow of the system 100 begins when the phishing website identification engine 144 accesses a first website 154a that comprises a first plurality of images 156a. In some cases the phishing website identification engine 144 may implement a script that automatically accesses websites 154 including the first website 154a. The first website 154a is known to be a phishing website 130 that is attempting to impersonate a target website (e.g., a trusted and/or well-known website). The phishing website identification engine 144 extracts the first plurality of images 156a from the first website 154a. The first plurality of images 156a may comprise images 156a-1, 156a-2, etc. The first plurality of images 156a may include all images 156a or a subset of images 156a displayed on the first website 154a. For example, the first plurality of images 156a may include a logo, a background image, a foreground image, etc., displayed on the first website 154a.

Generating Hash Values for the Images

The phishing website identification engine 144 generates a hash value 164a for each image 156a from the first plurality of images 156a. In one embodiment, the phishing website identification engine 144 may generate a hash value 164a for each image 156a. In this embodiment, the phishing website identification engine 144 may feed each image 156a to the hash function 160.

The hash function 160 may be implemented by the processor 142 executing software instructions 150, and is generally configured to generate a hash value 164 that is unique for an image 156. For example, the hash function 160 may include MD5, SHA, Base 64, cryptography, etc.

In one embodiment, the phishing website identification engine 144 may generate a hash value 164 for an image 156 based on determining pixel values of the image 156 and associating (or assigning) a hash value 164 for those pixel values. In other words, the generated hash value 164 may represent the content of the image 156, such as shapes, colors, text, symbols, numbers, and/or any other item being displayed on the image 156. For example, for a particular image 156a, the phishing website identification engine 144 may generate a set of hash values for a set of pixels of the particular image 156a, and take an average value of the set of hash values (or combine the set of hash values) to generate the hash value 164a for the particular image 156a.

The phishing website identification engine 144 may generate each hash value 164a from a first plurality of hash values 164a for a corresponding image 156a from the first plurality of images 156a. For example, the phishing website identification engine 144 may generate a first hash value 164a-1 that uniquely identifies the first image 156a-1, a second hash value 164a-2 that uniquely identifies the second image 156a-2, and so on. The phishing website identification engine 144 may generate a hash value 164a for a corresponding image 156a. For example, each hash value 164a may comprise a string of letters, numbers, and/or symbols. In another example, each hash value 164a may comprise a serial number.

In one embodiment, the phishing website identification engine 144 may generate a hash value 164a for each image 156a and a string indicating at least a portion of a directory path of that image 156a to a location where the image 156a is stored to the hash function 160. For example, during extracting the images 156a, the phishing website identification engine 144 extracts directory paths of the images 156a, e.g., indicated in the DOM properties associated with the images 156a on the first website 154a. The phishing website identification engine 144 may add a portion or all of the extracted directory path for an image 156a to be hashed with the image 156a by the hash function 160. For example, generating the first hash value 164a-1 may comprise feeding the first image 156a-1 and a first string indicating at least a portion of a first directory path of the first image 156a-1 to a first location where the first image 156a-1 is stored to the hash function 160. In another example, generating the second hash value 164a-2 may comprise feeding the second image 156a-2 and a second string indicating at least a portion of a second directory path of the second image 156a-2 to a second location where the second image 156a-2 is stored to the hash function 160.

Generating an Overall Hash Value for the First Website

The phishing website identification engine 144 may generate a first overall hash value 168a for the first website 154a. In one embodiment, in this process, the phishing website identification engine 144 may feed the hash values 164a to a compute module 166. The compute module 166 may comprise a hash function, etc. For example, the compute module 166 may be implemented by the hash function 160 or another hash function 160. Thus, in one example, the first overall hash value 168a may be a hash of the hash values 164a.

The compute module 166 may be implemented by the processor 142 executing software instructions 150, and is generally configured to generate an overall hash value 168 from the hash values 164. In an example where the compute module 166 comprises a hash function, the compute module 166 may input the hash values 164a (or 164b) to the compute module 166, and generate a hash of the hash values 164a, i.e., overall hash value 168a (or 168b, respectively).

Upon determining the overall hash value 168a for the first website 154a, the phishing website identification engine 144 may use this information to identify other websites 154 whose overall hash values 168 correspond to the first overall hash value 168a. A particular example where the phishing website identification engine 144 determines whether a second website 154b is associated with the phishing website 130 (e.g., phishing website 130a or 130b, etc.) is described below.

Determining Whether a Second Website is a Associated with a Phishing Website

The phishing website identification engine 144 may be configured to determine whether the second website 154b is associated with any phishing website 130. The corresponding description below describes determining whether the second website 154b is associated with the first phishing website 130a.

To determine whether the second website 154b is associated with the phishing website 130a, the phishing website identification engine 144 may extract a second plurality of images 156b from the second website 154b. The phishing website identification engine 144 may extract the second plurality of images 156b from the second website 154b similar to that described above with respect to extracting the first plurality of images 156a from the first web site 154a. The second plurality of images 156b may comprise images 156b-1, 156b-2, etc. The second plurality of images 156b may include all images 156b or a subset of images 156b displayed on the second website 154b. For example, the second plurality of images 156b may include a logo, a background image, a foreground image, etc., displayed on the second website 154b.

The phishing website identification engine 144 may generate a hash value 164b for each image 156b from the second plurality of images 156b similar to that described above with respect to generating hash values 164a for images 156a. For example, for a particular image 156b, the phishing website identification engine 144 may generate a set of hash values for a set of pixels of the particular image 156b, and take an average value of the set of hash values (or combine the set of hash values) to generate the hash value 164b for the particular image 156b.

The phishing website identification engine 144 may generate a first hash value 164b-1 that uniquely identifies the first image 156b-1, a second hash value 164b-2 that uniquely identifies the second image 156b-2, and so on. The phishing website identification engine 144 may generate a hash value 164b for a corresponding image 156b. For example, each hash value 164b may comprise a string of letters, numbers, and/or symbols. In another example, each hash value 164b may comprise a serial number.

The phishing website identification engine 144 generates a second overall hash value 168b for the second website 154b, similar to that described above with respect to generating the first overall hash value 168a. The phishing website identification engine 144 feeds the hash values 164b to the compute module 166 to generate the second overall hash value 168b. Thus, in one example, the second overall hash value 168b may be a hash of the hash values 164b. The phishing website identification engine 144 may implement the same hash function that it used to generate the first overall hash value 168a to generate the second overall hash value 168b.

Upon generating the second overall hash value 168b for the second website 154b, the phishing website identification engine 144 may compare the second overall hash value 168b with a plurality of overall hash values 168, each identifying and associated with a particular known phishing website 130, where the plurality of overall hash values 168 associated with the plurality of phishing websites 130 are stored in the phishing website database 180. For example, for determining whether the second website 154b is associated with the phishing website 130a, the phishing website identification engine 144 compares the overall hash value 168b with the overall hash value 168a. In another example, for determining whether the second website 154b is associated with the phishing website 130b, the phishing website identification engine 144 compares the overall hash value 168b with the overall hash value 168c, where the overall hash value 168c is associated with the second phishing website 130b. In other examples, the phishing website identification engine 144 may compare the overall hash value 168b with other overall hash values 168 associated with other known phishing websites 130.

If the phishing web site identification engine 144 determines that the overall hash value 168b corresponds to a particular overall hash value 168 (associated with a particular phishing website 130), the phishing website identification engine 144 links or associates the second website 154b and the overall hash value 168b to the particular phishing website 130, and stores this information to the phishing website database 180.

If, however, the phishing website identification engine 144 determines that the overall hash value 168b does not correspond to any of the overall hash values 168 in the phishing website database 180, the phishing website identification engine 144 adds the second website 154b and the overall hash value 168b as a newly determined phishing website 130 in the phishing website database 180. In other words, the phishing website identification engine 144 adds a new phishing website category or class that includes the second website 154b and the overall hash value 168b to the phishing website database 180. For example, the phishing website identification engine 144 may determine that the second website 154b is associated with phishing website 130 based on feedback from users 102 that have been victims of phishing attacks conducted on the second website 154b, feedback from operators monitoring potential phishing websites 130, and/or any other methods for detecting whether the second website 154b is associated with a phishing website 130 and/or contains phishing or fraudulent content and/or activity. For example, the phishing website identification engine 144 may receive feedback from users 102 and/or operators that the second website 154b contains fields that elicit users 102 to provide private information, e.g., indicating that the second website 154b is associated with fraudulent activity. The corresponding description below describes an example where the phishing website identification engine 144 determines whether the second website 154b is associated with the phishing website 130a.

To determine whether the second website 154b is associated with the phishing website 130a, the phishing website identification engine 144 compares the second overall hash value 168b with the first overall hash value 168a.

In one embodiment, the phishing website identification engine 144 may determine that the second website 154b is associated with the phishing website 130a if the second overall hash value 168b corresponds to the first overall hash value 168a.

In response to determining that the second website 154b is associated with the phishing website 130a (i.e., the second overall hash value 168b corresponds to the first overall hash value 168a), the phishing website identification engine 144 categorizes the second website 154b and the first website 154a into a first phishing website class 172. As such, the phishing website identification engine 144 may categorize or classify websites 154 based on a corresponding phishing campaign to which those websites 154 belong. In other words, the phishing website identification engine 144 classifies websites 154 that are associated with the same phishing website 130 into the same phishing website class 172. The phishing website identification engine 144 may also link or associate the second website 154b and the second overall hash value 168b to the phishing website 130a, and store this information in the phishing website database 180.

Once the phishing website identification engine 144 determines that the second website 154b is associated with the phishing website 130a, the phishing website identification engine 144 determines that a first fraudulent activity (e.g., first fraudulent payment activity) detected on the phishing website 130a is related to or associated with a second fraudulent activity (e.g., second fraudulent payment activity) detected on the second website 154b. In this manner, the phishing website identification engine 144 may determine the correlation between different fraudulent activities on different websites 154, and use this information to determine a source of the correlated fraudulent activities.

In response to determining that the second website 154b is associated with the phishing website 130, in one embodiment, the phishing website identification engine 144 may send an alert message 174 to the computing device 120 at which the second website 154b is accessed. The alert message 174 may indicate that the second website 154b is associated with the phishing website 130. In case it is determined that the second website 154b is not associated with the phishing website 130, the alert message 174 may indicate that the second website 154b is not associated with the phishing website 130. The phishing website identification engine 144 may send the alert message 174 to any access point (e.g., other computing devices 120) that are tasked to oversee the operations of the computing device 120.

Example Method for Phishing Website Identification

Figure 2:
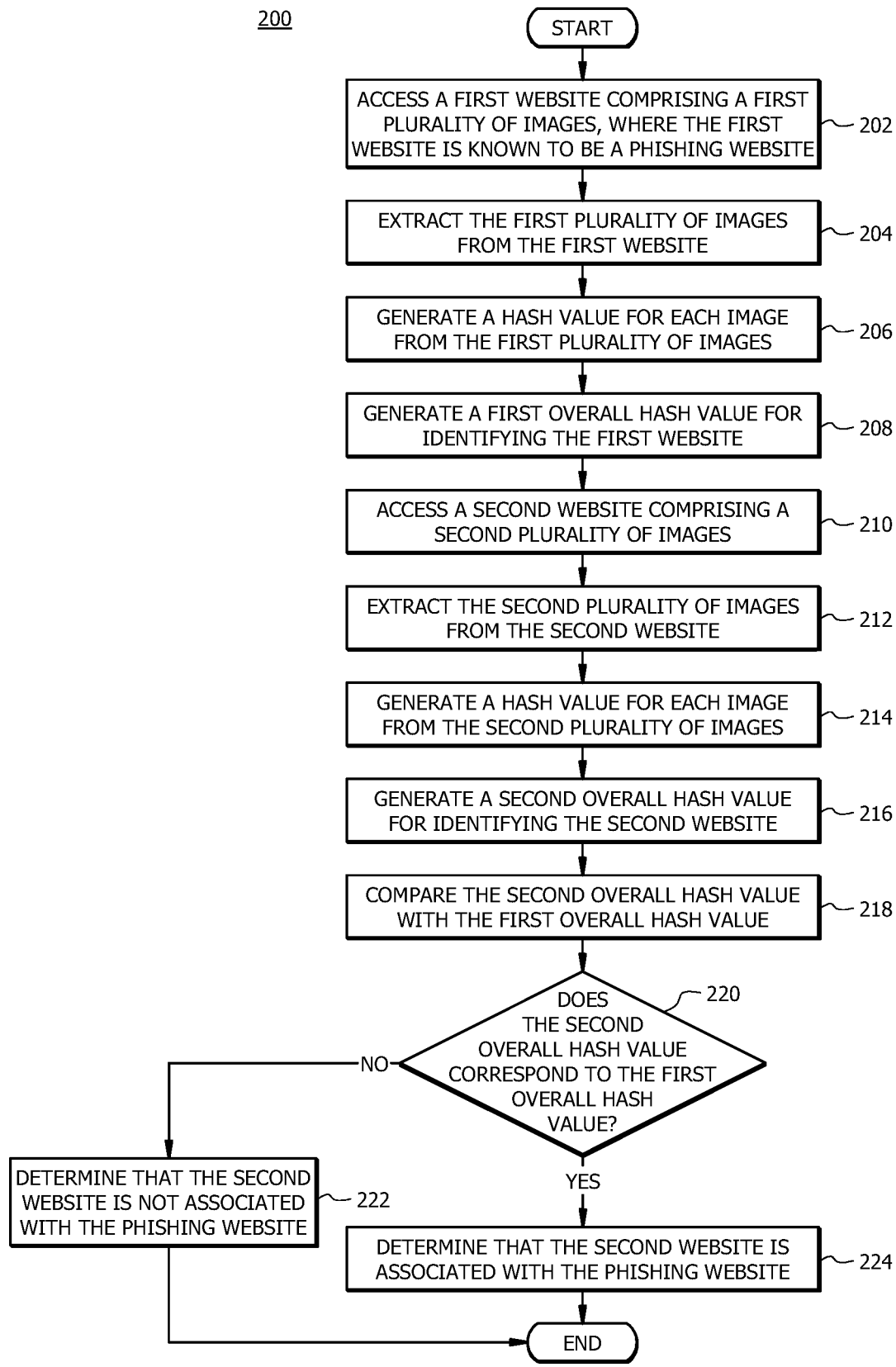
FIG. 2 illustrates an example flowchart of a method for phishing website identification based on image hashing.

FIG. 2 illustrates an example flowchart of a method 200 for identifying phishing websites 130. Modifications, additions, or omissions may be made to method 200. Method 200 may include more, fewer, or other steps. For example, steps may be performed in parallel or in any suitable order. While at times discussed as the system 100, processor 142, phishing website identification engine 144, or components of any of thereof performing steps, any suitable system or components of the system may perform one or more steps of the method 200. For example, one or more steps of method 200 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 202-224.

Method 200 begins at step 202 where the phishing website identification engine 144 accesses a first website 154a that comprises a first plurality of images 156a, where the first website 154a is known to be a phishing website 130. For example, the phishing website identification engine 144 may access the first website 154a when the first website 154a is accessed on the web browser 122. In another example, the phishing website identification engine 144 may intercept the first website 154a by a firewall device and/or configuration associated with the server 140 that monitors incoming and outgoing communications from the computing device 120 before the first website 154a arrives at the computing device 120.

At step 204, the phishing website identification engine 144 extracts the first plurality of images 156a from the first website 154a. For example, the phishing website identification engine 144 may execute the web scraping algorithm 158 to extract the first plurality of images 156a from the first website 154a, similar to that described above in FIG. 1.

At step 206, the phishing website identification engine 144 generates a hash value 164a for each image 156a from the first plurality of images 156a. For example, the phishing website identification engine 144 may feed each image 156a to the hash function 160 to generate a hash value 164a that uniquely identifies that image 156a, similar to that described above in FIG. 1. The hash value 164 may include a string of numbers, letters, and/or symbols, etc.

At step 208, the phishing website identification engine 144 generates a first overall hash value 168a for identifying the first website 154a. For example, the phishing website identification engine 144 may feed the hash values 164a to the compute module 166 to generate the first overall hash value 168a, similar to that described above in FIG. 1. The compute module 166 may comprise a hash function (e.g., MD5, SHA, Base 64, cryptography, etc.).

At step 210, the phishing website identification engine 144 accesses a second website 154*b* that comprises a second plurality of images 156*b*. For example, the phishing website identification engine 144 may access the second website 154*b* similar to that described in FIG. 1 and step 202 with respect to accessing the first website 154*a*.

At step 212, the phishing website identification engine 144 extracts the second plurality of images 156*b* from the second website 154*b*. For example, the phishing website identification engine 144 may extract the second plurality of images 156*b* from the second website 154*b* by executing the web scraping algorithm 158, similar to that described in FIG. 1.

At step 214, the phishing website identification engine 144 generates a hash value 164*b* for each image 156*b* from the second plurality of images 156*b*. For example, the phishing website identification engine 144 may generate the hash value 164*b* for each image 156*b* by feeding that image 156*b* to the hash function 160, similar to that described in FIG. 1.

At step 216, the phishing website identification engine 144 generates a second overall hash value 168*b* for identifying the second website 154*b*. For example, the phishing website identification engine 144 may feed the hash values 164*b* to the compute module 166 to generate the second overall hash value 168*b*, similar to that described above in FIG. 1.

At step 218, the phishing website identification engine 144 compares the second overall hash value 168*b* with the first overall hash value 168*a*. For example, the phishing website identification engine 144 may compare each element in the second overall hash value 168*b* with its counterpart element in the first overall hash value 168*a*.

At step 220, the phishing website identification engine 144 determines whether the second overall hash value 168*b* corresponds to the first overall hash value 168*a*, similar to that described above in FIG. 1. If the phishing website identification engine 144 determines that the second overall hash value 168*b* corresponds to the first overall hash value 168*a*, method 200 proceeds to step 224. Otherwise, method 200 proceeds to step 222.

At step 222, the phishing website identification engine 144 determines that the second website 154*b* is not associated with the phishing website 130.

At step 224, the phishing website identification engine 144 determines that the second website 154*b* is associated with the phishing website 130. In this process, the phishing website identification engine 144 may classify the first website 154*a* and the second website 154*b* into the first phishing website class 172 that is associated with the phishing website 130.

Example Method for Phishing Website Classification

Figure 3:
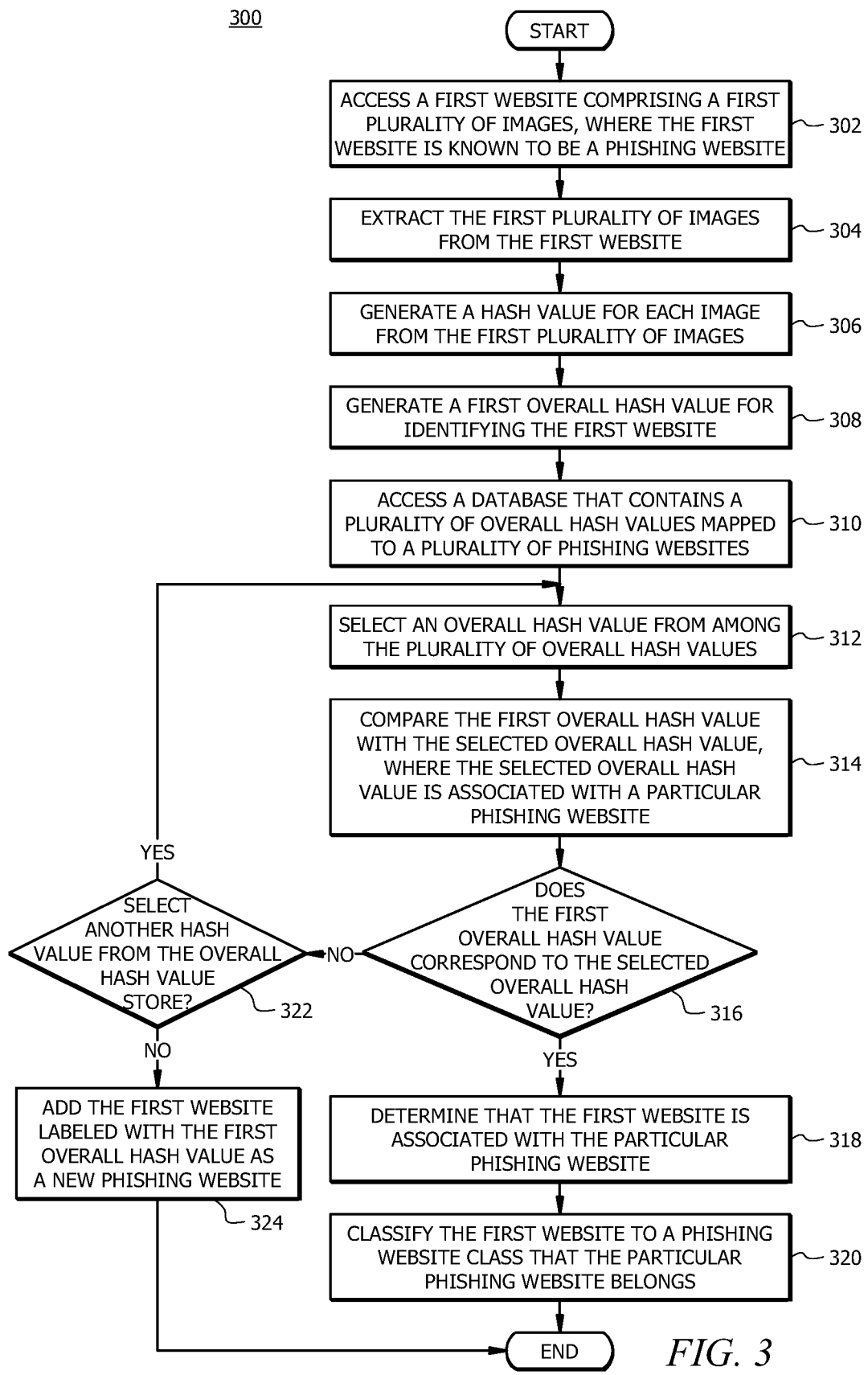
FIG. 3 illustrates an example flowchart of a method for phishing website classification based on image hashing.

FIG. 3 illustrates an example flowchart of a method 300 for classifying phishing websites 130. Modifications, additions, or omissions may be made to method 300. Method 300 may include more, fewer, or other steps. For example, steps may be performed in parallel or in any suitable order. While at times discussed as the system 100, processor 142, phishing website identification engine 144, or components of any of thereof performing steps, any suitable system or components of the system may perform one or more steps of the method 300. For example, one or more steps of method 300 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 302-324.

Method 300 begins at step 302 where the phishing website identification engine 144 accesses a first website 154*a* that comprises a first plurality of images 156*a*, where the first website 154*a* is known to be a phishing website 130. For example, the phishing website identification engine 144 may receive feedback indicating that the first website 154*a* is associated with fraudulent activities and/or contains fraudulent content enticing users 102 to provide private information. For example, the phishing website identification engine 144 may access the first website 154*a* when the first website 154*a* is accessed on the web browser 122. In another example, the phishing website identification engine 144 may intercept the first website 154*a* by a firewall device and/or configuration associated with the server 140 that monitors incoming and outgoing communications from the computing device 120 before the first website 154*a* arrives at the computing device 120.

At step 304, the phishing website identification engine 144 extracts the first plurality of images 156*a* from the first website 154*a*. For example, the phishing website identification engine 144 may execute the web scraping algorithm 158 to extract the first plurality of images 156*a* from the first website 154*a*, similar to that described above in FIG. 1.

At step 306, the phishing website identification engine 144 generates a hash value 164*a* for each image 156*a* from the first plurality of images 156*a*. For example, the phishing website identification engine 144 may feed each image 156*a* to the hash function 160 to generate a hash value 164*a* that uniquely identifies that image 156*a*, similar to that described above in FIG. 1. The hash value 164 may include a string of numbers, letters, and/or symbols, etc.

At step 308, the phishing website identification engine 144 generates a first overall hash value 168*a* for identifying the first website 154*a*. For example, the phishing website identification engine 144 may feed the hash values 164*a* to the compute module 166 to generate the first overall hash value 168*a*, similar to that described above in FIG. 1 and method 200 described in FIG. 2.

At step 310, the phishing website identification engine 144 accesses a database that contains a plurality of overall hash values 168 that is mapped to a plurality of phishing websites 130. For example, the phishing website identification engine 144 accesses the phishing website database 180.

At step 312, the phishing website identification engine 144 selects an overall hash value 168 from among the plurality of overall hash values 168. The phishing website identification engine 144 iteratively selects an overall hash value 168 until no more overall hash values 168 is left for evaluation. At step 314, the phishing website identification engine 144 compares the first overall hash value 168*a* with the selected overall hash value 168, similar to that described in FIG. 1. The selected overall hash value 168 is associated with a particular phishing website 130.

At step 316, the phishing website identification engine 144 determines whether the first overall hash value 168*a* corresponds to the selected overall hash value 168, similar to that described in FIG. 1. In other words, the phishing website identification engine 144 determines whether a matching or corresponding overall hash value 168 is found. If the phishing website identification engine 144 determines that the first overall hash value 168*a* corresponds to the selected overall hash value 168, method 300 proceeds to step 318. Otherwise, method 300 proceeds to step 322.

At step 318, the phishing website identification engine 144 determines that the first website 154a is associated with the particular phishing website 130.

At step 320, the phishing website identification engine 144 classifies the first website 154a to a phishing website class that the particular phishing website 130 belongs to. In this process, the phishing website identification engine 144 may add or classify the first website 154a to a first phishing website class, e.g., phishing website class 172 that the particular phishing website 130 belongs to. The phishing website identification engine 144 may update this phishing website classification in the phishing website database 180 by adding the first website 154a to this phishing website classification, i.e., first phishing website class 172.

At step 322, the phishing website identification engine 144 determines whether to select another hash value from the overall hash value store 168. The phishing website identification engine 144 determines to select another hash value from the overall hash value store 168 if at least one hash value remains in the overall hash value store 168. If the phishing website identification engine 144 determines to select another hash value, method 300 returns to step 312. Otherwise, method 300 proceeds to step 324.

At step 324, the phishing website identification engine 144 adds the first website 154a labeled with the first overall hash value 168a as a new phishing website 130, e.g., to the phishing website database 180. In this process, the phishing website identification engine 144 determines whether the first overall hash value 168a corresponds to any overall hash value 168 stored in the phishing website database 180. If the first overall hash value 168a does not correspond to any of the overall hash values 168 stored in the phishing website database 180, the phishing website identification engine 144 creates a new phishing website class, and add the first website 154a to the new phishing website class, and store it in the phishing website database 180.

In one embodiment, in response to classifying the first website 154a with the particular phishing website 130, the phishing website identification engine 144 determines that a first fraudulent activity detected on the first website 154a, e.g., phishing attack, is related to a second fraudulent activity detected on the particular phishing website 130, similar to that described above in FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for detecting phishing websites, comprising:
a processor configured to:
    access a first website comprising a first plurality of images, wherein the first website is known to be a phishing website that is attempting to impersonate a target website;
    extract the first plurality of images from the first website;
    for at least a first image from the first plurality of images, determine a first hash value for the first image, wherein the first hash value comprises a first serial number uniquely identifying the first image;
    determine a first overall hash value for the first website, wherein:
        determining the first overall hash value comprises hashing the first hash value; and
        the first overall hash value represents a first signature associated with the first website;
    access a second website comprising a second plurality of images;
    extract the second plurality of images from the second website;
    for at least a second image from the second plurality of images, determine a second hash value for the second image, wherein the second hash value comprises a second serial number uniquely identifying the second image;
    determine a second overall hash value for the second website, wherein:
        determining the second overall hash value comprises hashing the second hash value; and
        the second overall hash value represents a second signature associated with the second website;
    compare the second overall hash value with the first overall hash value;
    determine whether the second overall hash value corresponds to the first overall hash value;
    in response to determining that the second overall hash value corresponds to the first overall hash value, determine that the second website is associated with the phishing website; and
a memory, operably coupled with the processor, and operable to store the first plurality of images and the second plurality of images.

2. The system of claim 1, wherein the processor is further configured to, in response to determining that the second overall hash value corresponds to the first overall hash value, categorize the second website and the first website into a first phishing website category.

3. The system of claim 1, wherein:
determining the first hash value comprises:
    determining a first set of hash values for a first set of pixels of the first image; and
    taking an average value of the first set of hash values; and
determining the second hash value comprises:
    determining a second set of hash values for a second set of pixels of the second image; and
    taking an average value of the second set of hash values.

4. The system of claim 1, wherein:
  determining the first hash value comprises hashing the first image and a first string that indicates at least a portion of a first directory path of the first image to a first location where the first image is stored; and
  determining the second hash value comprises hashing the second image and a second string that indicates at least a portion of a second directory path of the second image to a second location where the second image is stored.

5. The system of claim 1, wherein:
  the processor is further configured to:
    determine a third hash value for a third image from the first plurality of images; and
    determine a fourth hash value for a fourth image from the second plurality of images; and
  determining the first overall hash value comprises hashing the first hash value and the third hash value; and
  determining the second overall hash value comprises hashing the second hash value and the fourth hash value.

6. The system of claim 1, wherein the processor is further configured to, in response to determining that the second website is associated with the phishing website, send an alert message to a computing device from which the second website is accessed, wherein the alert message indicates that the second website is associated with the phishing website.

7. The system of claim 1, further comprising a computing device from which the first website and the second website are accessed, wherein the computing device comprises a desktop computer or a mobile phone.

8. A method for detecting phishing websites, comprising:
  accessing a first website comprising a first plurality of images, wherein the first website is known to be a phishing website that is attempting to impersonate a target website;
  extracting the first plurality of images from the first website;
  for at least a first image from the first plurality of images:
    determining a first hash value for the first image, wherein the first hash value comprises a first serial number uniquely identifying the first image;
  determine a first overall hash value for the first website, wherein:
    determining the first overall hash value comprises hashing the first hash value; and
    the first overall hash value represents a first signature associated with the first website;
  accessing a second website comprising a second plurality of images;
  extracting the second plurality of images from the second website;
  for at least a second image from the second plurality of images:
    determining a second hash value for the second image, wherein the second hash value comprises a second serial number uniquely identifying the second image;
  determining a second overall hash value for the second website, wherein:
    determining the second overall hash value comprises hashing the second hash value; and
    the second overall hash value represents a second signature associated with the second website;
  comparing the second overall hash value with the first overall hash value; and
  determining whether the second overall hash value corresponds to the first overall hash value; and
  in response to determining that the second overall hash value corresponds to the first overall hash value, determining that the second website is associated with the phishing website.

9. The method of claim 8, further comprising, in response to determining that the second overall hash value corresponds to the first overall hash value, categorizing the second website and the first website into a first phishing website category.

10. The method of claim 8, wherein:
  determining the first hash value comprises:
    determining a first set of hash values for a first set of pixels of the first image; and
    taking an average value of the first set of hash values; and
  determining the second hash value comprises:
    determining a second set of hash values for a second set of pixels of the second image; and
    taking an average value of the second set of hash values.

11. The method of claim 8, wherein:
  determining the first hash value comprises hashing the first image and a first string that indicates at least a portion of a first directory path of the first image to a first location where the first image is stored; and
  determining the second hash value comprises hashing the second image and a second string that indicates at least a portion of a second directory path of the second image to a second location where the second image is stored.

12. The method of claim 8, further comprising:
  determining a third hash value for a third image from the first plurality of images;
  determining a fourth hash value for a fourth image from the second plurality of images;
  determining the first overall hash value comprises combining the first hash value with the third hash value; and
  determining the second overall hash value comprises combining the second hash value with the fourth hash value.

13. The method of claim 8, further comprising, in response to determining that the second website is associated with the phishing website, sending an alert message to a computing device from which the second website is accessed, wherein the alert message indicates that the second website is associated with the phishing website.

14. The method of claim 8, wherein the first website and the second website are accessed from a computing device that comprises a desktop computer or a mobile phone.

15. A computer program comprising executable instructions stored in a non-transitory computer-readable medium that when executed by a processor causes the processor to:
  access a first website comprising a first plurality of images, wherein the first website is known to be a phishing website that is attempting to impersonate a target website;
  extract the first plurality of images from the first website;
  for at least a first image from the first plurality of images:
    determine a first hash value for the first image, wherein the first hash value comprises a first serial number uniquely identifying the first image;
  determine a first overall hash value for the first website, wherein:
    determining the first overall hash value comprises hashing the first hash value; and
    the first overall hash value represents a first signature associated with the first website;

access a second website comprising a second plurality of images;
extract the second plurality of images from the second website;
for at least a second image from the second plurality of images:
  determine a second hash value for the second image, wherein the second hash value comprises a second serial number uniquely identifying the second image;
determine a second overall hash value for the second website, wherein:
  determining the second overall hash value comprises hashing the second hash value; and
  the second overall hash value represents a second signature associated with the second website;
compare the second overall hash value with the first overall hash value;
determine whether the second overall hash value corresponds to the first overall hash value; and
in response to determining that the second overall hash value corresponds to the first overall hash value, determine that the second website is associated with the phishing website.

16. The computer program of claim 15, wherein the instructions when executed by the processor, further cause the processor to, in response to determining that the second overall hash value corresponds to the first overall hash value, categorize the second website and the first website into a first phishing website category.

17. The computer program of claim 15, wherein:
determining the first hash value comprises:
  determining a first set of hash values for a first set of pixels of the first image; and
  taking an average value of the first set of hash values; and
determining the second hash value comprises:
  determining a second set of hash values for a second set of pixels of the second image; and
  taking an average value of the second set of hash values.

18. The computer program of claim 15, wherein:
determining the first hash value comprises hashing the first image and a first string indicating at least a portion of a first directory path of the first image to a first location where the first image is stored; and
determining the second hash value comprises hashing the second image and a second string that indicates at least a portion of a second directory path of the second image to a second location where the second image is stored.

19. The computer program of claim 15, wherein the instructions when executed by the processor, further cause the processor to:
determine a third hash value for a third image from the first plurality of images;
determine a fourth hash value for a fourth image from the second plurality of images, wherein:
  determining the first overall hash value comprises combining the first hash value with the third hash value; and
  determining the second overall hash value comprises combining the second hash value with the fourth hash value.

20. The computer program of claim 15, wherein the first website and the second website are accessed from a computing device, wherein the computing device comprises a desktop computer or a mobile phone.

* * * * *